United States Patent

Cooper, Jr.

[15] 3,665,118

[45] May 23, 1972

[54] CONTROL SIGNAL RECORDING

[72] Inventor: Dexter P. Cooper, Jr., Pasadena, Calif.

[73] Assignee: Bell & Howell Company, Chicago, Ill.

[22] Filed: Apr. 7, 1969

[21] Appl. No.: 814,110

[52] U.S. Cl. ............................179/100.2 S, 179/100.2 MD

[51] Int. Cl. ..................G11b 5/48, G11b 23/18, G11b 23/36

[58] Field of Search...........179/100.2 S, 100.4 D, 100.2 MD, 179/100.2 A; 340/174.1 C, 174.1 G, 174.1 H

[56] References Cited

UNITED STATES PATENTS

| | | | |
|---|---|---|---|
| 2,929,670 | 3/1960 | Garrity | 179/100.2 MD |
| 2,697,754 | 12/1954 | Ranger | 179/100.2 |
| 2,712,572 | 7/1955 | Roberts | 179/100.2 |
| 3,185,972 | 5/1965 | Sippel | 340/174.1 |

FOREIGN PATENTS OR APPLICATIONS

| | | | |
|---|---|---|---|
| 174,220 | 3/1953 | Austria | 179/100.2 |

*Primary Examiner*—Bernard Konick
*Assistant Examiner*—Alfred H. Eddleman
*Attorney*—Raymond A. Andrew and Luc P. Benoit

[57] ABSTRACT

Improved methods and apparatus for magnetically recording control signals on magnetic recording tape to provide magnetic control signal records which extend over several recording channels at an angle thereto, or at an angle to another magnetic control signal record, or which are in the form of a chevron pattern, or which have the form of a series of magnetized regions aligned in a longitudinal direction of the tape; and improved control signal records provided by these methods.

5 Claims, 5 Drawing Figures

INVENTOR.
DEXTER P. COOPER, JR.

INVENTOR.
DEXTER P. COOPER, JR.

CONTROL SIGNAL RECORDING

BACKGROUND OF THE INVENTION

1. Field of the Invention

The subject invention relates to magnetic recording and, more particularly, to magnetic recording of control signals on magnetic recording tape.

2. Description of the Prior Art

The need for recorded and played-back control signals in magnetic tape recording systems is well known. By way of example, it is frequently desirable to have control signals recorded on the tape in order to facilitate the access to desired information records on the tape or in order to enable automatic search operations for preselected recorded programs.

Ideally, the control signal record should not unduly consume tape space which would be useful for information recording purposes ("information" is here used to designate intelligence other than the control signals). To this end it has been suggested to record control signals at a certain signal frequency and to employ electrical filter means during the playback operation for a mutual separation of the control signals and played-back information. This, however, has the disadvantage of rendering the control signal retrieval speed-sensitive, since the frequency of the played-back control signal is a function of the tape speed.

Quite apart from the fact that high-quality tape recorders permit a selection of different tape speeds, it is also to be noted that a sophisticated tape recorder control system should be capable of functioning not only during tape playback, but at least also during fast tape forward, especially if program search operations are to be carried out.

Since it is well known that several recordings can be superimposed if they are made at different angles, the idea presents itself to superimpose the control signals on the information recording track or channel by means of a recording head which has a recording gap that extends at an angle relative to the recording gap of the information recording head. If this is done in a single recording channel, the respective signal strengths require that the control signal recording gap extend as closely as feasible at right angles to the information recording gap, since the mutual cross-talk is at a minimum with such an orthogonal arrangement.

Such a gap arrangement, however, has its disadvantages. For one thing, modern tape stock is usually oriented in a preferred direction of magnetization, and signals recorded at an angle of up to 90° to such preferred direction are not well recorded. Moreover, the conventional orientation of the information recording gap should preferably not be changed, so that an orthogonally oriented control signal recording gap would, in effect, extend in parallel to the tape edges. This would not only raise difficulties in view of the customary preferred orientation of magnetization of such media as sound recording tapes, but would also impose severe limitations on the permissible length of the control signal recording gap. The latter restriction arises from the fact that a magnetic element cannot be effectively magnetized if it runs along a recording gap while the signal to be recorded goes through one or more alternating-current half-cycle.

SUMMARY OF THE INVENTION

The subject invention presents several related solutions to the above mentioned problems.

From one aspect thereof, the invention resides in apparatus for magnetically recording information and a first control signal and a second control signal on a magnetic recording tape having two physically distinct elongate recording regions. This aspect of the invention is characterized by the improvement which comprises, in combination , first recording head means for recording a first part of said information in one of said elongate recording regions and a second part of said information in the other of said elongate recording regions, and second recording head means having a first recording gap and a second recording gap, said first recording gap extending over said one of said elongate recording regions and at an angle to a longitudinal direction of said one elongate recording region and at an angle to information recorded in said one of said elongate recording regions, and said second recording gap extending over the other of said elongate recording regions and at an angle to said first recording gap and at an angle to information recorded in said other of said elongate recording regions, and means for magnetically energizing said second recording head means at said first recording gap with said first control signal and at said second recording gap with said second control signal whereby said first control signal is recorded at said first recording gap in said one recording region and said second control signal is recorded at said second recording gap in said other recording region.

Since the orientation of magnetization of the control signal records extends at an angle to the elongate recording regions, the control signal record does not run in the same direction as the information record, the orientation of magnetization of which customarily runs in the direction of each elongate recording region. The impact of the control signal on the information signal is thus lessened.

In accordance with a preferred embodiment of the invention, each of the recording regions includes more than one signal recording channel, and the first recording gap of the above mentioned second recording head means extends over all recording channels of the one recording region, and the second recording gap of the second recording head means extends over all recording channels of the mentioned other recording region.

Since the recording signal record is distributed over several recording channels the impact of the control signal on the information signal is further reduced. Since different information signals are typically recorded in the several recording channels, the effect of these information signals on the control signal is randomly distributed.

In this manner, a control signal-to-information signal separation is provided which practically equals or even surpasses the separation attainable with mutually orthogonal recording techniques, without the above mentioned attendant disadvantages of such orthogonal techniques.

As this description proceeds, it will be noted that these improvements not only retain advantages of the first-defined method, but also permit a bidirectional tape operation without interference between control signals pertaining to one direction of operation and control signals pertaining to the other direction of operation of the recording tape.

From another aspect thereof, the subject invention resides in apparatus for magnetically recording a control signal on a magnetic recording tape, and is characterized by the improvement which comprises magnetic recording head means having a plurality of first magnetic pole pieces and a plurality of second magnetic pole pieces, with the first and second pole pieces being aligned in a longitudinal direction of said tape, and mutually spaced to define a plurality of recording gaps, and with the second pole pieces alternating with the first pole pieces, and winding means included in said recording head means for magnetizing said first pole pieces in one sense while magnetizing said second pole pieces in the opposite sense of magnetization, and means connected to said winding means for selectively energizing said winding means with an electric control signal current.

This latter improvement has the advantage of providing a control signal record which is not speed sensitive, in that it can be recorded onto or played back from magnetic recording tape which is at standstill or travels at any reasonable velocity.

BRIEF DESCRIPTION OF THE DRAWINGS

The invention and its various aspects will become more readily apparent from the following detailed description of preferred embodiments thereof illustrated by way of example in the accompanying drawings in which.

DESCRIPTION OF PREFERRED EMBODIMENTS

Figure 1:
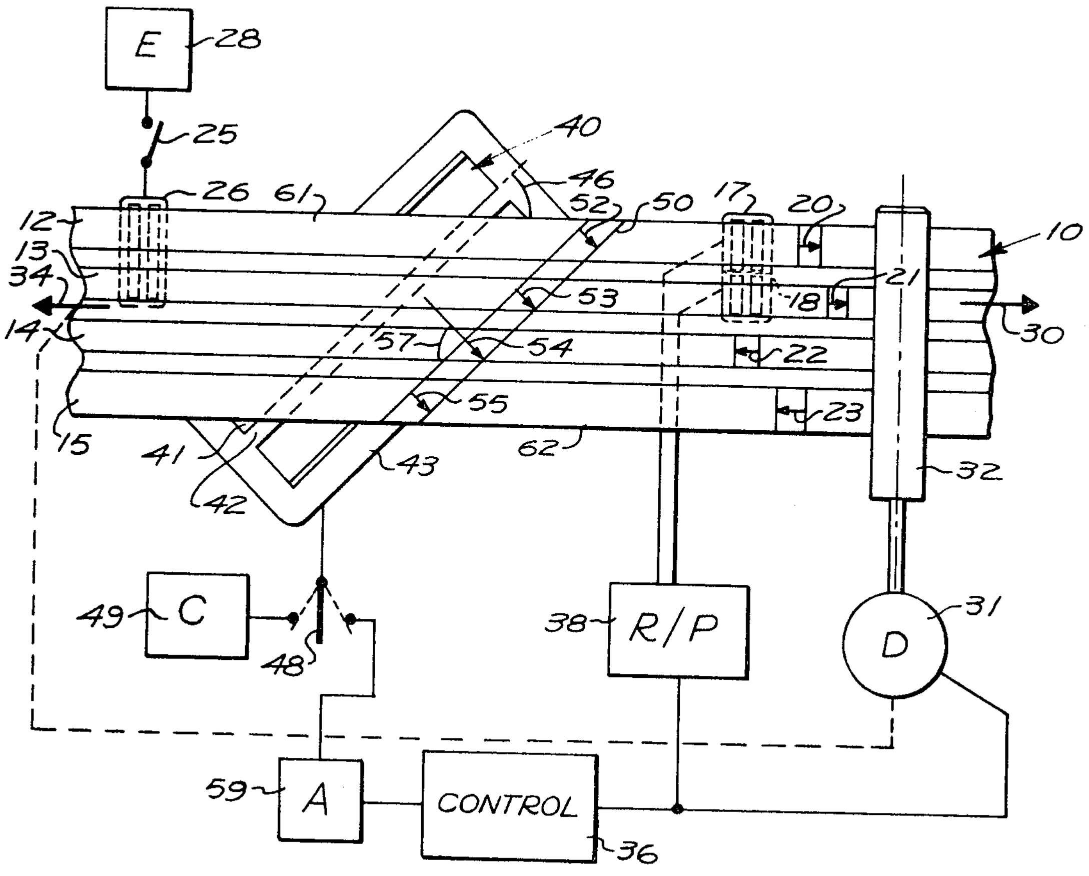
FIG. 1 is a diagrammatic plan view of a control signal recording device, and includes a schematic illustration of related parts and circuitry.

The magnetic recording tape 10 shown in FIG. 1 has four information recording channels 12, 13, 14 and 15. These channels need not be the result of a physical division, but may simply be the result of a mode of recording in four different tracks. By way of example, the channels 12 and 13 may represent two stereo channels of a first musical presentation, while the channels 14 and 15 may represent the stereo channels of a second musical presentation.

Two conventional magnetic recording head 17 and 18 are provided for recording information in the channels 12 and 13 and, upon a turning about of the tape in the manner effected in cassette recorders, for recording further information in the channels 14 and 15. The arrows 20 to 23 symbolize the respective orientation of magnetization of the information records in channels 12 to 15.

Prior to a recording operation a switch 25 may be closed to connect an erasing head 26 to a conventional source 28 of erasing alternating current. The head 26 then serves in a conventional manner to erase previously recorded information preparatory to the recording of further information by the heads 17 and 18.

During recording, the tape 10 is advanced in the direction of arrow 30 by a tape drive 31 which acts on the tape through a capstan 32.

In accordance with conventional practice, the tape drive 31 is also utilized to selectively rotate a tape take-up reel (not shown) for a fast forward advance of the tape, and a tape supply reel (not shown) for a fast tape rewind. An arrow 34 indicates the direction of travel of the tape during rewind operations.

The apparatus illustrated in FIG. 1 further includes a control 36 for selecting a recording, a playback, a fast forward, and a tape rewind mode of operation. Controls of this type are known in the tape recorder art.

Moreover, the apparatus of FIG. 1 includes equipment 38 for effecting the recording and playback of information, such as music or speech, in cooperation with the recording and playback heads 17 and 18.

The apparatus illustrated in FIG. 1 further includes a control signal recording and playback head 40 which has a magnetic armature 41 that defines a recording and playback gap 42 and that is magnetically energized by a winding 43.

In accordance with a preferred embodiment of the subject invention the recording gap 42 extends over all the recording channels or tracks 12 through 15, so that the desired signal strength is distributed over these channels. In addition, the recording and playback gap 42 extends at an angle 46 to the elongate channels 12 through 15.

Preparatory to the recording of a control signal a switch 48 is actuated so as to connect a source 49 of the control signal to the winding 43 of the control signal recording head 40. The resulting control signal record 50 has an orientation of magnetization as indicated by the arrows 52 through 55. This orientation of magnetization extends at an angle 57 to the elongate recording channels 12 through 15. This angle, of course, corresponds to the above mentioned angle 46. Also, the angle 57 is the angle present between the orientation of magnetization of the control signal, as indicated by arrows 52 through 55, and the orientation of magnetization of the information indicated by arrows 20 through 23.

Since the signal recording gap 42 extends over more than one recording channel, it is clear that the angle 57 has to be less than 90°. This, of course, means that a vectorial component of the control signal record will be picked up by the heads 17 and 18 upon playback of the recorded information. This apparent disadvantage is in fact a wise compromise since, despite of the angle 57, the control signal can be recorded on a magnetic tape that has a preferred direction of magnetization longitudinally of the tape 10, and since one and the same erasing head 26 will be able to erase both information and control signals. If the orientation of magnetization of the control signal record 50 were, in accordance with one of the above mentioned prior-art teachings, orthogonal to the orientation of magnetization of the information record, then commercial magnetic recording tape with a preferred direction of magnetization could not be employed and more than one erasing head would have to be provided for erasing the information and control signals.

Upon the initiation of an information playback operation, the switch 48 is actuated so that the winding 43 of the control signal recording and playback head 40 is connected to an actuator 59. The actuator 59 is responsive to a playback of a control signal record 50 by the head 40 for the purpose of initiating a desired control operation. Since the actuator 59 and its function are not part of the subject invention it is not illustrated herein in detail.

However by way of example, be it assumed that the tape 10 has recorded thereon a language teaching program broken down into several sections. At the end of a playback of each section, the student is supposed to repeat the words spoken in that section. To facilitate this process, a control signal record 50 is provided at the end of each section. The actuator 59 includes an electrically operated tripping mechanism (not shown) which trips the control 36 to a quiescent position in response to each played-back control signal so that the playback of linguistic information stops each time a control signal record 50 is encountered. By way of example, the actuator 59 may include an amplifier for amplifying the played-back control signal and a solenoid energized by such amplified control signal for actuating a tripping bar of the control 36.

Upon the stopping of the playback operation in the manner just described, the student has time to repeat the played-back words and, upon having done so, will actuate the control 36 for the playback of the next segment of the teaching program. A wide variety of further possible control, actuator or selector arrangements readily suggests itself to those skilled in the tape recorder control art. To name but one further example, control signal records of the type of record 50 could be employed to facilitate a selection of desired programs, or initiate a tape rewind operation preparatory to a repeat performance of the recorded information. The nature and structure of the selector equipment required for this type of operation are, however, beyond the scope of the subject invention.

The system illustrated in FIG. 1 has certain drawbacks if the selections demarcated by control signal records 50 and recorded during tape movement in one direction do not have counterparts of equal length recorded during tape movement in the opposite direction. This is easily seen if it is assumed that information in the channels 12 and 13 is recorded with the tape edges 61 and 62 positioned as shown in FIG. 1, and that information is thereupon recorded in the channels 14 and 15 after the tape 10 has been turned about itself so that the tape edge 61 takes the illustrated place of the edge 62, and the edge 62 takes the illustrated place of the tape edge 61. In such a case the control signal recording and playback head 40 cannot upon playback distinguish whether the control signal record 50 was meant for one direction of tape travel or for the other.

Figure 2:
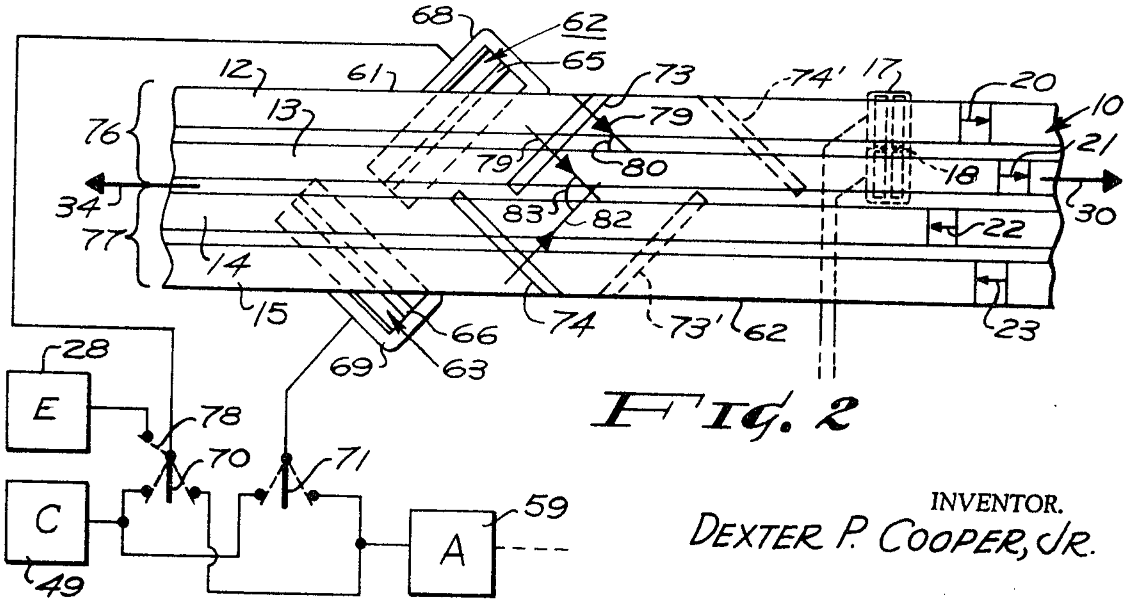
FIG. 2 is a plan view of control signal recording means in accordance with preferred embodiments of the invention.

A preferred embodiment illustrated in FIG. 2 overcomes this problem by providing a first control signal recording and playback head 62 and a second control signal recording and playback head 63, each of which corresponds to the control signal recording and playback head 40 shown in FIG. 1. The head 62 has a recording and playback gap 65 and the head 63 has a recording and playback gap 66 which correspond to the gap 42 of the head 40. Similarly, the winding 68 of the head 62 and the winding 69 of the head 63 correspond to the winding 43 shown in FIG. 1.

Two switches 70 and 71 correspond to the switch 48 shown in FIG. 1. If a control signal record 73 is to be established by the head 62 the switch 70 is actuated to connect the head winding 68 to the control signal source 49. Similarly if a control signal record 74 is to be established by the head 63, the switch 71 is actuated to connect the head winding 69 to the control signal source 49.

For a playback of the control signal record 73, the switch 70 is actuated to connect the head winding 68 to the actuator 59 so that played-back control signals are applied to this actuator for a control action of the type described above in connection with FIG. 1. For a playback of the control signal record 74, the switch 71 is actuated to connect the head winding 69 to the actuator 59 so that played-back control signals are applied to this actuator for a control action of the type described above in connection with FIG. 1. The remainder of the system may be the same as that of FIG. 1 and is thus not again illustrated in FIG. 2.

The first control signal recording and playback head 68 in FIG. 2 extends only in the first elongate recording region 76 while the second control signal recording and playback head 63 extends only in the elongate recording region 77. In the preferred embodiment of FIG. 2, the region 76 includes the channels 12 and 13, while the region 77 includes the channels 14 and 15.

The position of the recording and playback gap 65 of the head 62 is such that the control signal record 73 has an orientation of magnetization 79 which extends at an angle to a longitudinal direction of the elongate recording region 76. In contrast thereto, the position of the recording and playback gap 66 of the head 63 is such that the orientation of magnetization 82 of the control signal record 74 in the region 77 extends at an angle 83 to the orientation of magnetization 79 of the control signal record 73 in the region 76.

If upon the recording of information in the region 76 and preparatory to the recording of further information in the region 77 the tape 10 is turned about itself so that the tape edge 61 takes the illustrated place of the edge 62 and the tape edge 62 takes the illustrated place of the edge 61, then the position of the control signal record 73 is as shown in dotted lines at 73′ while the position of the control signal record 74 is as shown in dotted lines at 74′ in FIG. 2. Owing to the presence of the angle 83 between the records 73 and 74, the record 73, when in the position 73′, extends at an angle to the gap 66 of the head 63, while the record 74 then extends at an angle to the gap 65 of the head 62.

In this manner, the record 73 is picked up by the head 62 at high signal strength, but is picked up by the head 63 at only greatly diminished signal strength. Similarly, the record 74 is picked up by the head 63 at great signal strength, but is picked up by the head 62 at only greatly diminished signal strength.

It will not be recognized that the system of FIG. 2 provides control signal records which are automatically allocated to each one of a given direction of tape travel in bidirectional tape recording and playback systems.

The system of FIG. 2, with its two control signal heads 62 and 63, is particularly suited for recorders in which the tape 10 is first advanced in one direction for one recording operation or series of operations and is then advanced in the opposite direction (without a turning of the tape about itself) for a subsequent recording operation or series of recording operations.

In recorders in which the tape is turned about itself (so that the edge 61 takes the illustrated place of the edge 62 and the edge 62 takes the illustrated place of the edge 61) between recording operations in one channel or set of channels and recording operations in the other channel or set of channels (as is the case in a typical cassette recorder) the control signal head 63 and the switch 71 may be omitted. In this case, the control signal head 62 records and subsequently plays back the control signals in both elongate recording regions 76 and 77.

This latter modified embodiment lends itself to a further preferred embodiment of yet another aspect of the invention.

According to this further embodiment the control signal recording and playback head 62 is also used as an erasing head. To this end, the switch 70 has a further position 78 in which the winding 68 of the head 62 is connected to an erasing current source 28. In practical operation, the switch 70 is maintained in the position 78 during recording operations, so that the recording channel is cleared prior to each instant of information recording. Whenever it is desired to establish a control signal record 73, the switch is actuated to connect the head winding 68 temporarily to the source 49 which provides a control signal of sufficient strength to be distinctly recorded on the tape 10.

In this manner, the head 62 performs both the function of an erasing head and of a control signal recording and playback head. Since the head gap 65 extends at an angle to the elongate information recording regions 76 and 77, or to the channels 12 through 15, the head 62 is not only capable of erasing control signal records 73, but is also capable of erasing information records. This principle, as such, is also applicable to systems in which there is only one recording channel on the tape 10 for each direction of tape advancement, or in which there is only one recording channel and only one direction of tape advancement during recording or playback.

In some applications a certain drawback may, however, arise from the fact that the control signal records provided according to FIG. 2 extend over only one-half of the channels covered by control signal records provided in accordance with FIG. 1.

Figure 3:
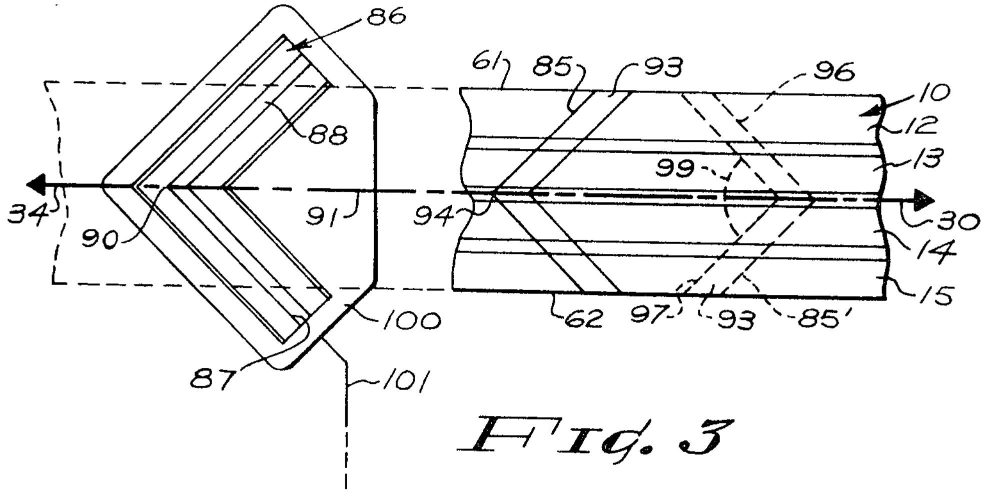
FIG. 3 is a plan view of a control signal recording head in accordance with a preferred embodiment of the invention.

This drawback, where significant, is remedied by the preferred embodiment illustrated in FIG. 3.

According to FIG. 3 a control signal record 85 is established on the tape 10 by a head 86. This head has a recording and playback gap 87 which extends over all the channels 12 through 15 so that the control signal record 85 is accordingly distributed. The recording and playback gap 87 extends in the configuration of a chevron 88 which points in one of the directions of operation 30 and 34 of the tape 10. In the preferred embodiment of FIG. 3, the chevron configuration 88 has an apex 90 located on a longitudinal center line 91 through the recording tape 10.

This, of course, imparts on the control signal record 85 a chevron configuration 93 having an apex 94 located on the center line 91.

If after completion of a recording operation in the channels 12 and 13, and preparatory to a further recording operation in the channels 14 and 15 the tape 10 is turned about itself so that the tape edge 61 takes the position illustrated for the edge 62, and the tape edge 62 takes the position illustrated for the edge 61 in FIG. 3, then the control signal record 85 takes the position illustrated in FIG. 3 at 85′. In this manner the leg 96 of the chevron configuration 93 extends at an angle to the gap 87 of the control signal recording and playback head 86. The head 86 is thus able to pick up the control signal record 85 at great signal strength if the record is oriented as shown in solid lines in FIG. 3, but will only pick up such record at greatly diminished signal strength if the same is oriented as shown at 85′.

Upon further consideration of FIG. 3 it will be recognized that control signals recorded by the head 86 during tape movement in either of the directions 30 and 34 are automatically distinguished from control signals which have been recorded by the head 86 during the opposite direction of tape movement.

The head 86 is magnetically energized by a winding 100 to which control signals are applied through a lead 101. The remainder of the system of FIG. 3 may be the same as the one illustrated in FIG. 1.

Figure 4:
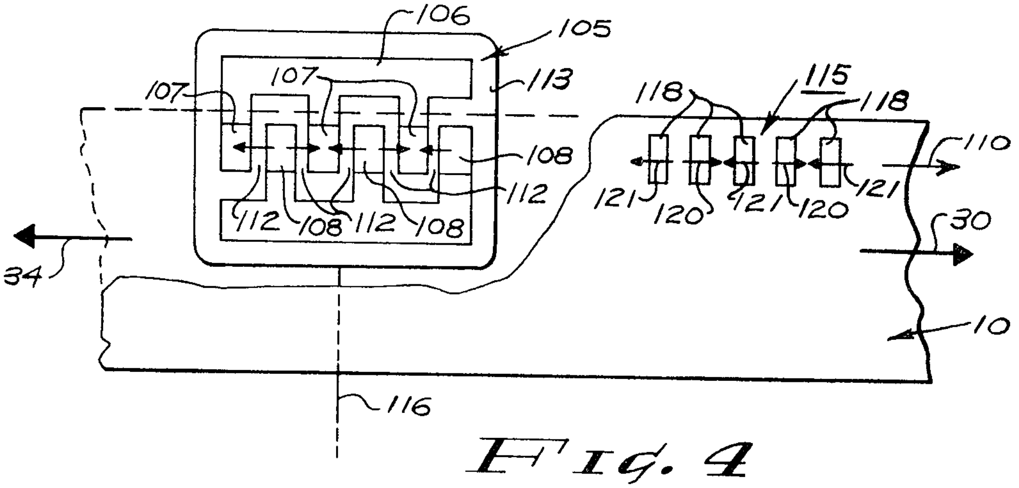
FIG. 4 is a plan view of a control signal recording head in accordance with a preferred embodiment of the invention.

A further control signal recording system according to a preferred embodiment of the subject invention is illustrated in FIG. 4. According to FIG. 4 a control signal recording and playback head 105 has an armature 106 with a plurality of first magnetic pole pieces 107 and a plurality of second magnetic pole pieces 108. The first and second pole pieces 107 and 108 are aligned in a longitudinal direction 110 of the tape 10 and are mutually spaced to provide a plurality of recording gaps 112. In addition, the second pole pieces 108 alternate with the first pole pieces 107.

The head 105 includes winding means 113 which are arranged on the armature 106 for magnetizing the first pole pieces 107 in one sense while magnetizing the second pole pieces 108 in the opposite sense of magnetization. In this manner, a magnetic control signal record 115 is established upon energization of the winding 113 through a lead 116 which may be selectively connected to a control signal source 49 (see FIG. 1).

As shown in FIG. 4, the control signal record 115 includes a series of magnetized regions 118 which are aligned in the direction 110, and alternate ones of which have an orientation of magnetization 120 which is opposite to the orientation of magnetization 121 of the remaining ones of these magnetized regions.

This latter pattern of magnetization orientation aids the head 105 during playback operations to distinguish the control signal record 115 from magnetic signal records which do not possess such a pattern. This effect may be emphasized by providing an irregular spacing between the recording and playback gaps 112, which leads to a corresponding irregular spacing of the magnetized regions 118 of the control signal record 115.

Figure 5:
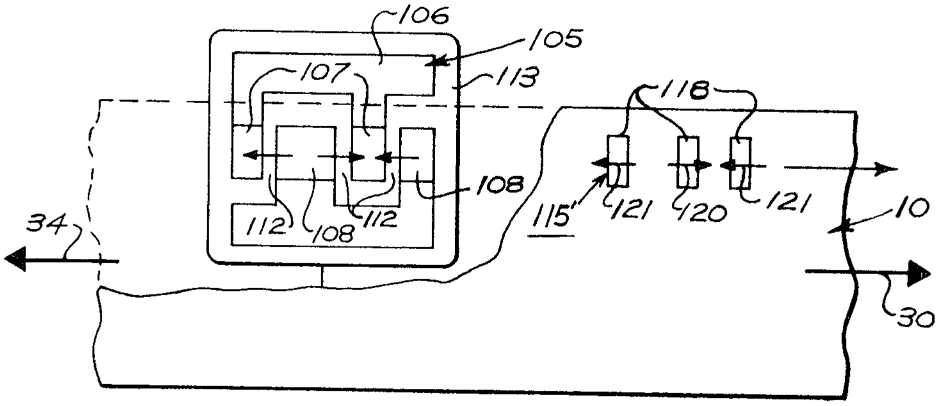
FIG. 5 illustrates a modification of the control signal recording head shown in FIG. 4.

An arrangement providing such an irregular spacing code is illustrated in FIG. 5 where like reference numerals designate like parts as between the FIGS. 4 and 5. The resulting record with irregularly spaced regions 118 is illustrated in FIG. 5 at 115'.

The remainder of the system of FIG. 4 or 5 may be similar to the one illustrated in FIG. 1.

The system of FIG. 4 or 5 has the advantage of making the control signal record 115 or 115' speed independent. If desired, the control signal record 115 or 115' may be established by energizing the winding 113 with a direct-current pulse.

While specific preferred embodiments have been discussed and illustrated herein, variations and modifications thereof within the spirit and scope of the invention will be apparent or suggest themselves to those skilled in the art.

I claim:

1. In apparatus for magnetically recording information and a first control signal and a second control signal on a magnetic recording tape having two physically distinct elongate recording regions, the improvement which comprises in combination first recording head means for recording a first part of said information in one of said elongate recording regions and a second part of said information in the other of said elongate recording regions, and second recording head means having a first recording gap and a second recording gap, said first recording gap extending over said one of said elongate recording regions and at an angle to a longitudinal direction of said one elongate recording region and at an angle to information recorded in said one of said elongate recording regions, and said second recording gap extending over the other of said elongate recording regions and at an angle to said first recording gap and at an angle to information recorded in said other of said elongate recording regions, and means for magnetically energizing said second recording head means at said first recording gap with said first control signal and at said second control recording gap with said second signal whereby said first control signal is recorded at said first recording gap in said one recording region and said second control signal is recorded at said second recording gap in said other recording region.

2. An apparatus as claimed in claim 1, wherein each of said recording regions includes more than one signal recording channel, and wherein said first recording gap extends over all recording channels of said one recording region, and said second recording gap extends over all recording channels of said other recording region.

3. An apparatus as claimed in claim 1, including means for selectively applying an electric erasing current to said second recording head means.

4. In apparatus for magnetically recording a control signal on a magnetic recording tape, the improvement which comprises magnetic recording head means having a plurality of first magnetic pole pieces and a plurality of second magnetic pole pieces, with the first and second pole pieces being aligned in a longitudinal direction of said tape, and mutually spaced to define a plurality of recording gaps, and with the second pole pieces alternating with the first pole pieces, and winding means included in said recording head means for magnetizing said first pole pieces in one sense while magnetizing said second pole pieces in the opposite sense of magnetization, and means connected to said winding means for selectively energizing said winding means with an electric control signal current.

5. An apparatus as claimed in claim 4, wherein said pole pieces are arranged and constructed so that said recording gaps are irregularly spaced from each other.

* * * * *